United States Patent [19]
Taylor

[11] 3,971,250
[45] July 27, 1976

[54] ELECTRET SENSING MEDIUM HAVING PLURAL SENSING UNITS

[75] Inventor: Allen L. Taylor, Woodbury, Minn.

[73] Assignee: Minnesota Mining and Manufacturing Company, St. Paul, Minn.

[22] Filed: Feb. 18, 1975

[21] Appl. No.: 550,536

[52] U.S. Cl. .......................... 73/88.5 R; 73/355 R; 73/362 CP; 73/DIG. 4; 307/88 ET; 310/8.6; 317/247; 317/262 F
[51] Int. Cl.² ...................... G01B 7/16; G01K 7/00; H01G 7/02
[58] Field of Search .................. 73/88.5 R, 88.5 SD, 73/DIG. 4, 355 R, 362 R, 362 CP; 307/88 ET; 310/8.6, 8.9; 317/247, 262 F

[56] References Cited
UNITED STATES PATENTS

| 2,614,144 | 10/1952 | Howatt | 310/8.6 |
| 2,769,867 | 11/1956 | Crownover et al. | 310/8.6 X |
| 3,453,432 | 7/1969 | McHenry | 73/355 R X |

*Primary Examiner*—Donald O. Woodiel
*Assistant Examiner*—Frederick Shoon
*Attorney, Agent, or Firm*—Alexander, Sell, Steldt & DeLaHunt

[57] ABSTRACT

A sensing medium having two sensing units each formed of a layer of poled electret material that is coated on each planar surface with an electrically conductive plate, such sensing units being separated from one another by a thermal insulating layer.

7 Claims, 6 Drawing Figures

ELECTRET SENSING MEDIUM HAVING PLURAL SENSING UNITS

BACKGROUND OF THE INVENTION

1. Field of the Invention

The present invention relates in general to the broad area of sensing mediums and more specifically to a sensing medium that includes a plurality of layers of electret material as sensing elements that may be employed to provide temperature compensation.

2. Description of the Prior Art

One common definition of an electret is a dielectric material permanently polarized by heating the material and placing it in a strong electric field during cooling. Electrets are commonly classified on the basis of pyroelectric or piezoelectric properties, both of which produce an electrical signal due to a change in dipole moment. Although pyroelectric and piezoelectric materials are often thought of as two distinct classes of electrets, actually piezoelectric materials are a generic class in which pyroelectric materials are included as a species. Thus, a large number of materials have both pyroelectric and piezoelectric characteristics.

Several temperature compensated detectors that employ pyroelectric sensing mediums are described in a U.S. Pat. to McHenry, No. 3,453,432, and in my co-pending application Ser. No. 430,055, filed Jan. 2, 1974 and entitled "Pyroelectic Temperature Compensated Sensing Apparatus now U.S. Pat. No. 3,877,308, issued Apr. 15, 1975. Although such known detectors provide heat sensing detection that is temperature compensated, none of these earlier detectors disclose a sensing medium that can be conveniently manufactured in a continuous configuration in tape form.

The present invention provides a sensing medium that may be readily constructed in tape form in order to facilitate its use in a wide variety of applications.

SUMMARY OF THE INVENTION

The present invention provides a sensing medium formed of two sensing units each having a layer of electret material with conductive plates carried on each planar surface, which sensing units are in surface-to-surface contact with a thermal insulating layer that separates one sensing unit from the other.

The sensing medium of the present invention may be employed to form a temperature compensated sensor by interconnecting the conductive plates of one sensing unit with the conductive plates of the other sensing unit to form two sets of plates, and strapping a sensing circuit electrically between the sets of plates for sensing certain electrical signals thereon. When the ambient temperatures of both electret layers of the two sensing units are equally varied, electrostatic charges will appear on each of the interconnected plates but will be negated due to the interconnections between the plates. However, temperature variation of only one of the electret layers of the sensing unit produces a net electrostatic charge on the plates in contact with the temperature varied layer. Also, when the sensing medium is subjected to bending stress a net electrostatic charge is produced on the plates of both sensing units. The sensing circuitry is employed to respond to such produced net charges and provide a perceptible indication of the amount of temperature variation or bending stress causing the charge production.

Thus, the sensing medium of the present invention provides a means for forming a temperature compensated sensing apparatus that is basically simplistic in construction but yet affords accurate and reliable stress or temperature sensing by use of plural electret sensing layers. In addition, the sensing medium of the present invention is durable and readily manufacturable in tape form for use in a wide variety of applications.

The foregoing and other advantages of the present invention will appear from the following description. In the description reference is made to the accompanying drawings, which form a part hereof, and in which there is shown by way of illustration and not of limitation, specific forms in which the invention may be embodied. Such embodiments do not represent the full scope of the invention, but rather the invention may be employed in a variety of other embodiments, and reference is made to the claims herein for interpreting the breadth of the invention.

DESCRIPTION OF THE PREFERRED EMBODIMENTS

Figure 1:
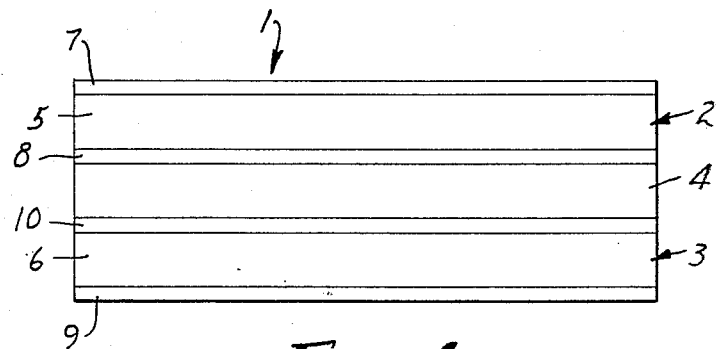
FIG. 1 is a diagrammatic end view of a sensing medium that represents a first preferred embodiment of the present invention and includes two sensing units.

Referring now to the drawings, and with reference first to FIG. 1, a sensing medium that represents a presently preferred first embodiment of the present invention is shown. The sensing medium 1 is formed of two sensing units 2 and 3 that are carried on and separated by a layer of thermal and electrical insulating material 4, such as polyurethane foam. The sensing units 2 and 3 each respectively include a single compliant layer of electrically nonconductive electret material 5 and 6.

The electret layers 5 and 6 are formed from materials having both pyroelectric and piezoelectric characteristics such as polyvinylidene fluoride. The layers 5 and 6 are positioned so that their poling is in the same direction as indicated by the arrows therein, and preferably have the same degree of poling. Although a few electret materials have dipoles that are naturally aligned in a poled relationship, normally the dipoles of electret materials are essentially arranged in random fashion. These dipoles can be rearranged in orientation when an electret material is exposed to an electric field and is heated above a particular temperature known as the poling temperature.

The electret layer 5 of the sensing unit 2 has its outer and inner planar surfaces respectively coated with thin, conductive plates 7 and 8, and the electret layer 6 of the sensing unit 3 has its outer and inner planar surfaces respectively coated with thin, conductive plates 9 and 10. The inner plates 8 and 10 of the sensing units 2 and 3 are fixed in surface-to-surface contact with the insulating layer 4 to form an integral assembly. It is preferable that the conductive plates 7–10 are all equal in size and that the electret layers 5 and 6 have equal degrees of poling to insure that when the layers 5 and 6 are uniformly heated or stressed, substantially equal levels of electrostatic charges will appear on the plates 7–10. Such conditions are not essential to the present invention because the plates 7–10 may differ in size and still provide equal charge accumulation by controlling the degree to which each of the electret layers 5 and 6 are poled.

For purposes of clarity, the thickness of the layers 4, 5 and 6 and the plates 7–10 are shown enlarged. The sensing medium 1 preferably is made with the layers 5 and 6 about 50 microns each and the plates 7–10 about 2 microns each. However, the layers 5 and 6 and the plates 7–10 may be made much thinner. The length of the layers 5 and 6 and the plates 7–10 is not a critical aspect of the present invention and they may be long or short depending on the particular sensing operation for which the sensing medium 1 is to be used. Accordingly, it is envisioned that the sensing medium 1 can be manufactured in long lengths and wound in rolls just like tape and may be cut to appropriate size by end users.

Figure 2:
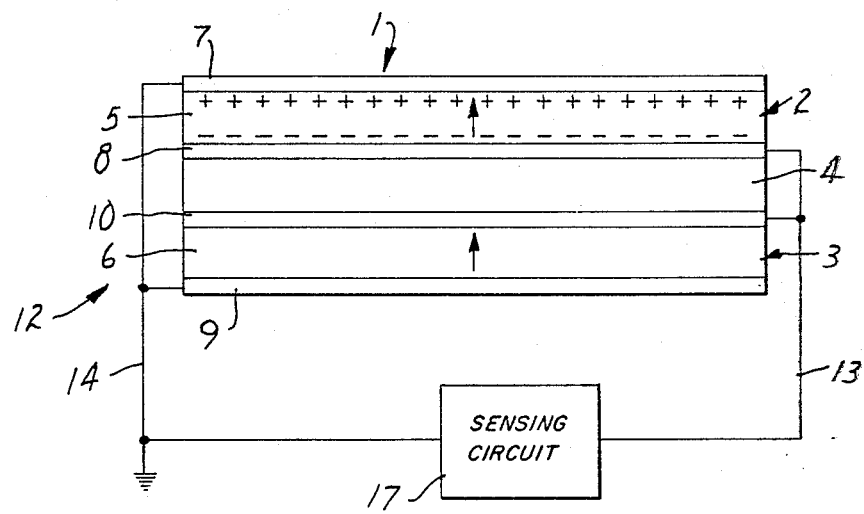
FIG. 2 is a diagrammatic end view of a first temperature compensated sensor incorporating the sensing medium of FIG. 1, which sensing medium is shown with an indication of electrostatic charges on one of the sensing units produced as a result of uniform heating of such unit.
Figure 3:
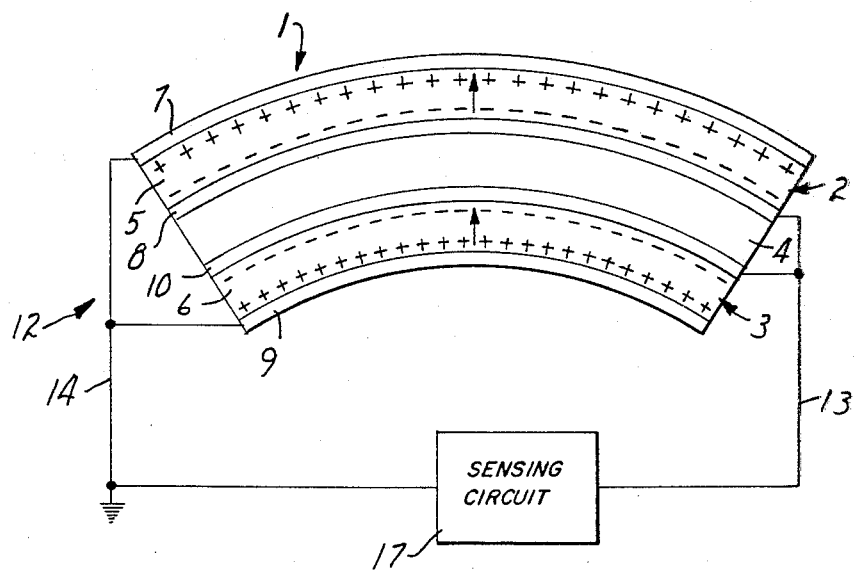
FIG. 3 is a diagrammatic end view of the sensor of FIG. 2 with the sensing medium shown in a bent condition and with an indication of electrostatic charges produced thereon as a result of such bending.

The sensing medium 1 may be employed to form a temperature compensated sensor 12, as shown in FIGS. 2 and 3, by using conductive leads 13 and 14 for respectively shorting together the inner conductive plates 8 and 10 to form one set of connected plates for shorting together the outer conductive plates 7 and 9 to form another set of connection plates. The conductive lead 14 is preferably grounded and a sensing circuit 17 is electrically connected across the leads 13 and 14 for sensing electrical charges that may be present on the plates 7–10. The sensing circuit 17 may be an ammeter, voltmeter or other type circuitry suitable for producing a sensing indication in response to small electrical signals.

To more fully clarify the use of the sensing medium 1 in forming the temperature compensated sensor 12, the operation of the sensor 12 will not be described. The sensor 12 may be advantageously employed as either an infrared radiation sensor or as a stress sensor to detect bending stress. To utilize the sensor 12 as an infrared radiation sensor it should be disposed so that only one of the sensing units 2 or 3, for example the sensing unit 2, is exposed to radiation desired to be detected. This may be accomplished by shielding the sensing unit 3 or by image directing means. Initially, exposure of the sensing unit 2 to infrared radiation will primarily heat the outer conductive plate 7 and such heating will produce a rise in temperature of the electret layer 5. The temperature rise of the layer 5 results in a generation of electrostatic charges of opposite polarities on the surface of the layer 5, as shown in FIG. 2, which charges accumulate on the conductive plates 7 and 8. Due to the insulating layer 4, the temperature rise of the sensing unit 2 will not be conducted to the sensing unit 3, but the electrostatic charges generated by the layer 5 will be distributed between the sets of plates 8 and 10 and 7 and 9 via the interconnecting leads 13 and 14 respectively. Thus, a net electrostatic potential will exist between the sets of plates 7 and 9, and 8 and 10, and will provide a sensing signal to the sensing circuit 17 indicative of the amount of radiation exposure of the sensing unit 2. It has been found that the sensitivity of the sensor 12 in detecting radiation may be increased by coating the outer conductive plates 7 and 9 of the sensing units 2 and 3 with a thin black layer to improve the radiation absorption of the sensor 12.

To utilize the sensor 12 as a bending stress sensor the insulating layer 4 should be formed of a material that is relatively stiff in comparison to the electret layers 5 and 6 and the plates 7–10. In this way, bending of the sensing medium 1 will occur about the longitudinal midpoint of the insulative layer 4, which midpoint is therefore a point of zero compression or expansion. Under such condition, bending of the medium 1, as indicated in FIG. 3, will result in extension of the layer 5 and compression of the layer 6. However, it should be understood that bending of the medium 1 in a direction opposite to that shown will produce compression of the layer 5 and extension of the layer 6.

Due to extension and compression of the layers 5 and 6, piezoelectrically produced charges will appear on the surfaces of the layers 5 and 6, with the charges on the inner surfaces of the layers 5 and 6 being of one polarity and the charges on the outer surfaces of another polarity as indicated in FIG. 3. Thus, a sensing signal will be provided to the sensing circuit 17 in direct correspondence to the bending of the medium 1.

In contrast to the above described radiation and stress sensing operations, the sensor 12 is compensated against providing a sensing indication as the result of pyroelectric charge production on the surfaces of the layers 5 and 6 when the sensing medium 1 is uniformly temperature varied. This may occur when there is a variation of ambient temperature of the environment in which the sensor 12 is located.

Upon uniform temperature variation of the sensing medium 1, pyroelectric charges will be produced by the electret layers 5 and 6 in accordance with their degree of poling, the amount of the temperature variation and their direction of poling. Because the poling of the layers 5 and 6 is in the same direction, a uniform distribution of pyroelectrically derived electrostatic charges of one polarity will accumulate on the plates 7 and 10 and an equal distribution of such charges of an opposite polarity will accumulate on the plates 8 and 9. Due to the interconnection of the plates 7 and 9 by the lead 14 and the plates 8 and 10 by the lead 13 the opposite polarity charges cancel one another and, thus, no net charge is provided the sensing circuit 17.

Figure 4:
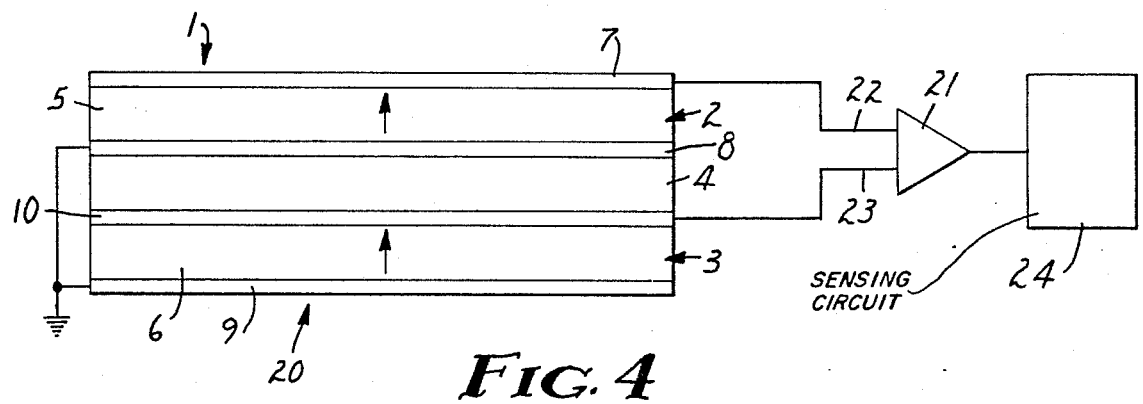
FIG. 4 is a diagrammatic end view of a second temperature compensated sensor incorporating the sensing medium of FIG. 1.

In addition to use in the above described sensor 12 the sensing medium 1 may also be employed in forming a sensor 20 as shown in FIG. 4. The sensor 20 is temperature compensated as is the sensor 12, but such compensation is achieved by use of a differential amplifier 21 with inputs 22 and 23 connected to the conductive plates 7 and 10 respectively, and with the plates 8 and 9 electrically grounded. However, if desired, the amplifier 21 can be connected to the plates 8 and 9, and the plates 7 and 10 would then be grounded. Because the amplifier 21 provides an output to a sensing circuit 24 only when the electrical signals at inputs 22 and 23 differ, equal temperature variations of the sensing unit 2 and 3 will not produce a sensing indication from the sensor 20. However, when only one of the sensors 2 or 3 is temperature varied, the differential amplifier 21 will deliver a sensing signal to the circuit 24.

Figure 5:
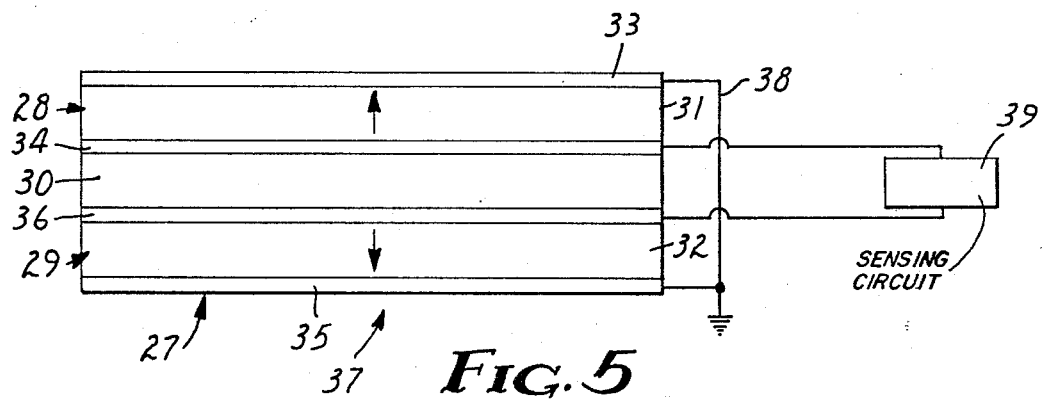
FIG. 5 is a diagrammatic end view of a sensing medium representing a second preferred embodiment of the present invention.

Referring now to FIG. 5, a second presently preferred embodiment of the present invention is shown in the form of a sensing medium 27. Similar to the medium 1, the medium 27 includes two sensing units 28 and 29 that are separated by an insulative layer 30 and are each formed with a poled electret layer 31 and 32 respectively. The layer 31 is coated on each planar surface with conductive plates 33 and 34, and the planar surfaces of the layer 32 is coated with conductive plates 35 and 36. Thus, the basic structure of the medium 27 is similar to that of the medium 1, but differs from the medium 1 in that the layers 31 and 32 are positioned so that their poling is in opposite directions, as indicated by arrows therein.

Figure 6:
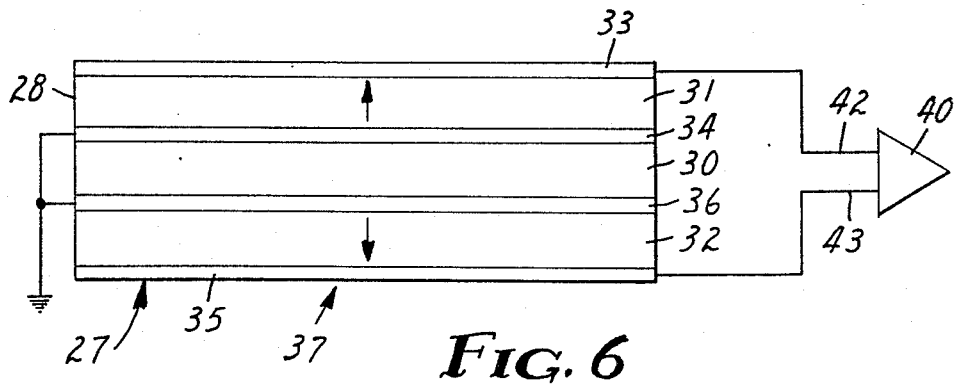
FIG. 6 is a diagrammatic end view of a temperature compensated sensor incorporating the sensing medium of FIG. 5.

The sensing medium 27 may be employed to form a temperature compensated sensor 37 by electrically shorting the outer conductive plates 33 and 35 together with a lead 38 that is preferably grounded, and connecting a sensing circuit 39 across the inner conductive plates 34 and 36. Because of the opposite poling of the electret layers 31 and 32, and in accordance with the previous discussion of the sensing medium 1, an equal temperature variation of both sensing units 28 and 29 will only result in the accumulation of equal amounts of electrostatic charges of the same polarity on the inner conductive plates 34 and 36. Thus, the sensing circuit 39 will not provide a sensing indication. In contrast, when only one of the sensing units 28 or 29 is temperature varied or when the medium 27 is placed under stress, a sensing signal will be received by the sensing circuit 39. Rather than being utilized to form the sensor 37, the sensing medium 27 may be employed with a differential amplifier 40, as shown in FIG. 6, to form a sensor 41. Inputs 42 and 43 of the amplifier 40 are preferably connected to the outer conductive plates 33 and 35 of the sensing units 28 and 29 respectively and the inner plates 34 and 36 are preferably grounded. However, such connections may be reversed if desired.

Thus, the present invention provides a sensing medium that may be employed in various embodiments to form a variety of sensors useful in a wide range of radiation or stress sensing applications in which temperature compensation of the sensor is desired.

What is claimed is:

1. A temperature compensated sensor comprising the combination of:
   a first sensing unit formed of:
   a first layer of poled pyroelectric material that produces electrostatic charges on its planar surfaces when its ambient temperature is varied, the charges on a first planar surface of said layer being opposite in polarity to the charges on a second planar surface of said layer;
   a first pair of conductive plates in surface-to-surface contact with said pyroelectric layer, said pair of plates including a first plate disposed on said first surface of said layer, and a second plate disposed on said second surface of said layer;
   a second sensing unit formed of:
   a second layer of poled pyroelectric material that produces electrostatic charges on its planar surfaces when its ambient temperature is varied, the charges on a first planar surface of said second layer being opposite in polarity to the charges on a second planar surface of said second layer and also opposite in polarity to the charges on the second surface of said first layer; and
   a second pair of conductive plates in surface-to-surface contact with said second pyroelectric layer, said pair of plates including a first plate disposed on said first surface of said layer, and a second plate disposed on said second surface of said layer; and
   a layer of thermally and electrically insulative material interposed between said first and second sensing units and in surface-to-surface contact with one of the conductive plates of each of said sensing units to thermally isolate said sensing units from one another;
   connecting means for electrically interconnecting various plates of said pairs to form two sets of interconnected plates, each set including at least one plate on one surface of said first pyroelectric layer and at least one plate on the surface of said second pyroelectric layer; and
   a sensing means connected to said two sets of interconnected plates for detecting electrostatic charges on at least one of said two sets of plates only when said plates are not similarly varied in temperature.

2. A temperature compensated sensor as recited in claim 1 wherein said connecting means includes:
   first means for interconnecting the first plate of one of said pairs to the second plate of the other of said pairs to form one interconnected set of plates; and
   second means for interconnecting the second plate of said one of said pairs to the first plate of the other of said pairs to form another interconnected set of plates.

3. A temperature compensated sensor as recited in claim 1 wherein the pyroelectric layers have different degrees of poling, but said pairs of conductive plates are different in size as to provide equal charge accumulation thereon when said pyroelectric layers are equally temperature varied.

4. A temperature compensated sensor as recited in claim 1 wherein the direction of poling of said pyroelectric layers is substantially the same.

5. A temperature compensated sensor as recited in claim 1 wherein said layers have the same degree of poling and said pairs of conductive plates are substantially equal in size.

6. A temperature compensated sensor as recited in claim 1 wherein at least one plate of one of said pairs of plates carries a radiation absorbent material.

7. A temperature compensated sensor as recited in claim 1 wherein the poling of said pyroelectric layers is substantially in opposite directions.

* * * * *

UNITED STATES PATENT AND TRADEMARK OFFICE
CERTIFICATE OF CORRECTION

PATENT NO. : 3,971,250
DATED : July 27, 1976
INVENTOR(S) : Allen L. Taylor

It is certified that error appears in the above-identified patent and that said Letters Patent are hereby corrected as shown below:

Column 3, line 50, change "not" to -- now --.

Signed and Sealed this

Ninth Day of November 1976

[SEAL]

Attest:

RUTH C. MASON
*Attesting Officer*

C. MARSHALL DANN
*Commissioner of Patents and Trademarks*